Oct. 12, 1937.  H. J. CRABBS  2,095,797
CIRCUIT INTERRUPTER
Original Filed Nov. 11, 1933   3 Sheets-Sheet 2
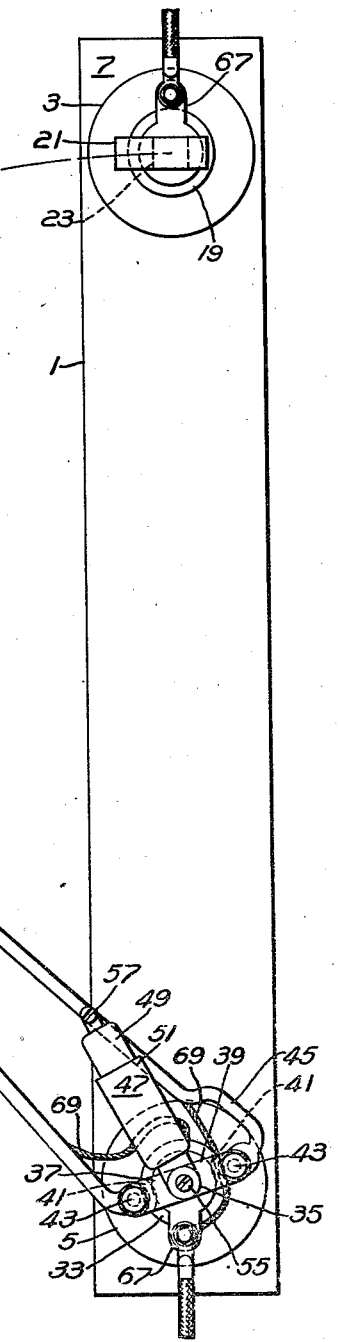
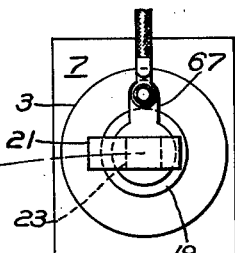
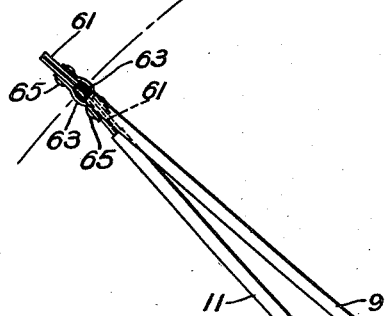
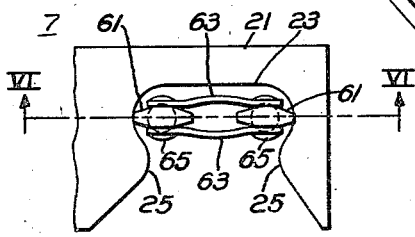
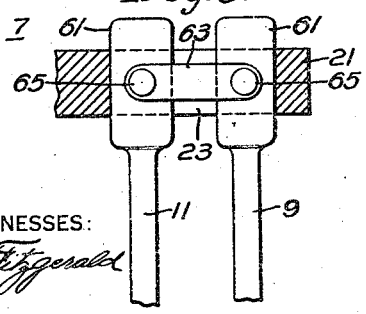
INVENTOR
Herbert J. Crabbs.
BY
ATTORNEY

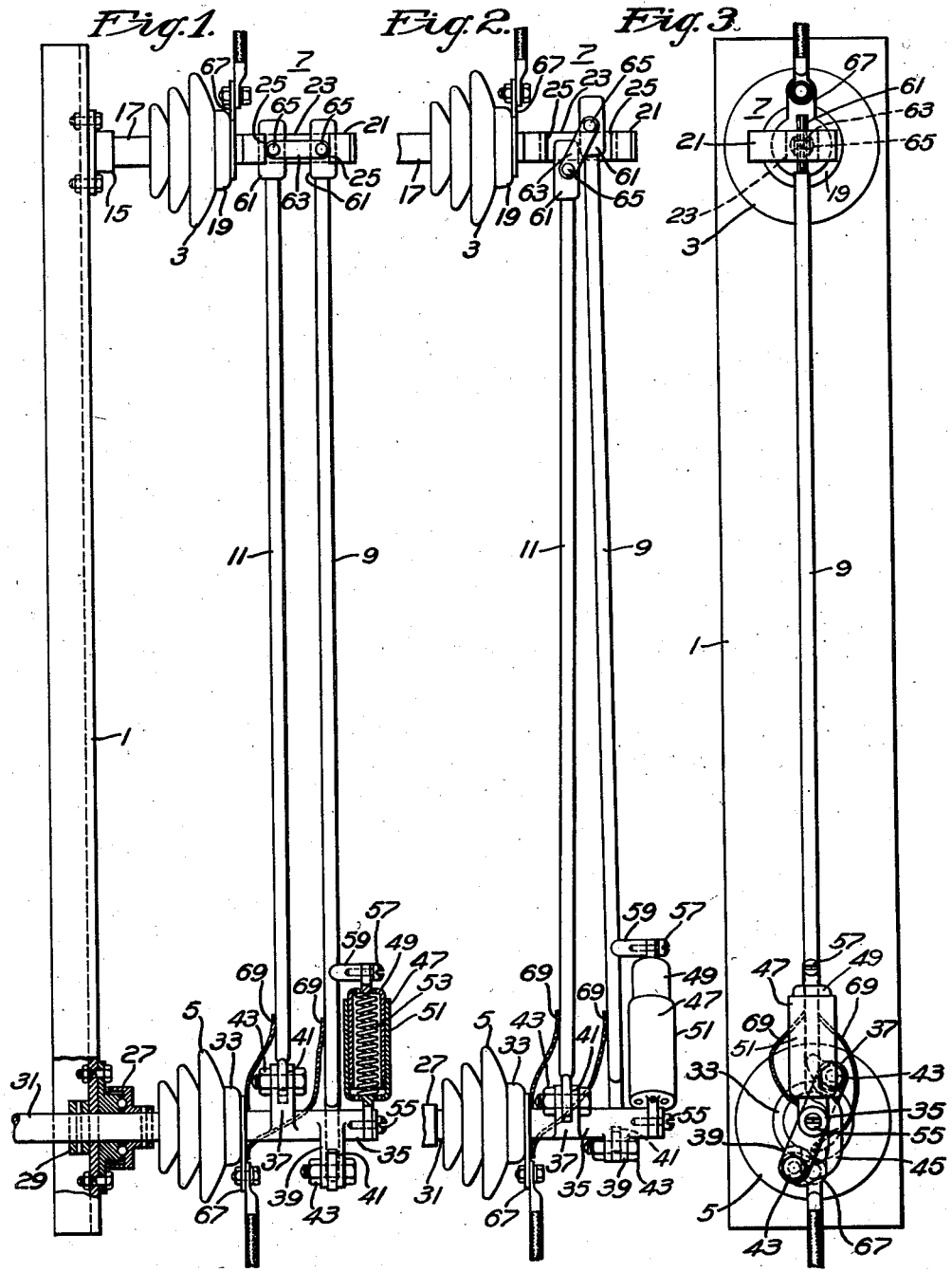

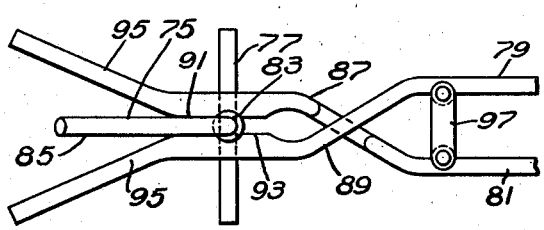
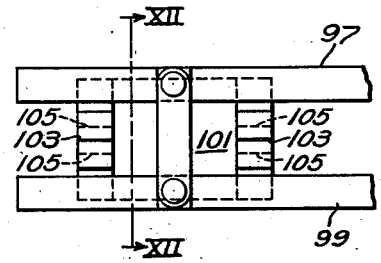
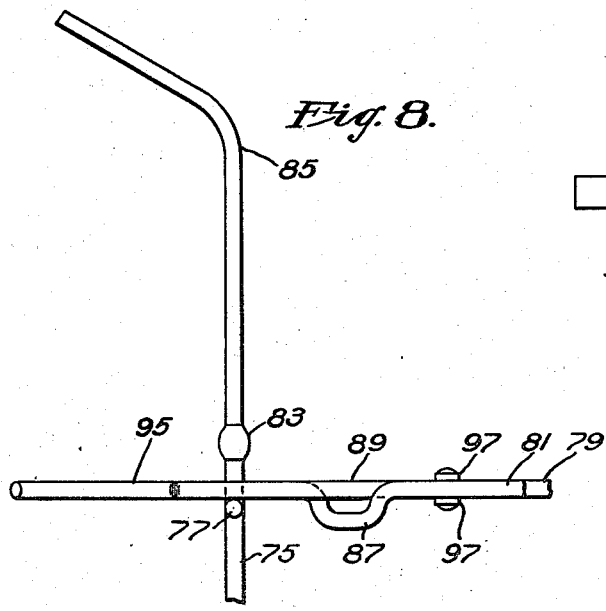
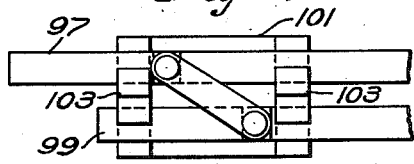
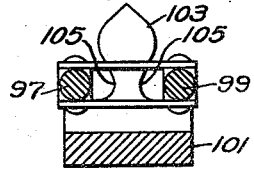
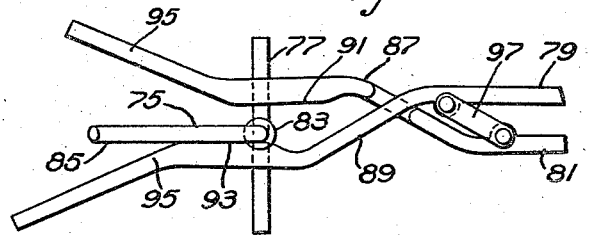
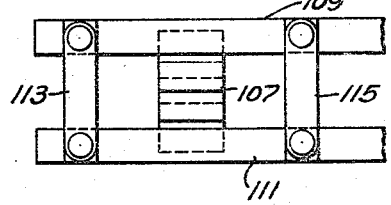
INVENTOR
Herbert J. Crabbs.

Patented Oct. 12, 1937

2,095,797

UNITED STATES PATENT OFFICE 2,095,797

CIRCUIT INTERRUPTER

Herbert J. Crabbs, Wilkinsburg, Pa., assignor to Westinghouse Electric & Manufacturing Company, East Pittsburgh, Pa., a corporation of Pennsylvania Application November 11, 1933, Serial No. 697,612
Renewed February 20, 1937

35 Claims. (Cl. 200—48)

My invention relates to circuit interrupters and particularly to manually operated disconnecting switches for use with medium and high voltage transmission circuits.

Switches of this type are ordinarily used for isolating or sectionalizing portions of a transmission line. Usually they are mounted outdoors and are subjected to very severe weather conditions as a result of ice and sleet formations. Moreover, in the normal course of events, the switches are operated very infrequently, thus providing an almost ideal condition for oxide and corrosion formation. The switches must be low in cost, due to the large number used; they must be capable of reliable operation under the most adverse conditions without unduly straining the supporting insulators; the contact mechanism must include means for cutting through corrosion during the circuit-closing operation so as to insure good electrical contact; and further, the switches must be inherently safe in order to prevent injury to the operator or to the protected equipment.

It is an object of my invention, therefore, to provide an improved, high-voltage disconnecting switch that shall be inexpensive to manufacture, safe and reliable in operation, and that shall include means for securing high-pressure contact between the engaging contact surfaces without unduly straining the supporting insulators.

A further object of my invention is to provide a simple and effective means for causing a wiping action between the engaging contact surfaces of a disconnecting switch.

A further object of my invention is to provide means for locking the movable blade means of the disconnecting switch in the closed circuit position, the locking means to be releasable by actuation of the blade operating mechanism.

A still further object of my invention is to provide an improved, two-insulator, disconnecting switch which shall accomplish the above stated objects through the use of a single operating mechanism entirely mounted on one of the two insulators.

These and other objects of my invention will be more clearly understood from the following description of an embodiment of my invention as applied to a two-insulator, side-break disconnecting switch.

Referring to the drawings:

Figure 1 is an elevational view, partly in section, showing a two-insulator, side break, disconnecting switch embodying the principal features of my invention. The switch is in the closed-circuit position.

Fig. 2 is a fragmentary elevational view showing the disconnecting switch illustrated in Fig. 1, in the partially open position.

Fig. 3 is a plan view of the disconnecting switch shown in Fig. 1 in the closed circuit position.

Fig. 4 is a plan view of the disconnecting switch shown in Fig. 1 in the open circuit position.

Fig. 5 is a detail view showing the contact structure of the switch illustrated in Figs. 1 to 4.

Fig. 6 is a sectional view taken on the line VI—VI of Fig. 5.

Fig. 7 is a fragmentary plan view showing a modified form of contact structure suitable for use with the disconnecting switch shown in Figs. 1 to 4.

Fig. 8 is a fragmentary elevational view of the contact structure shown in Fig. 7.

Fig. 9 is a fragmentary view of the contact structure shown in Fig. 7 in the partially open position.

Fig. 10 is a fragmentary plan view showing a second modified contact structure.

Fig. 11 is a fragmentary detail view showing the contact structure of Fig. 10 in the closed circuit position.

Fig. 12 is a sectional view taken on the line XII—XII of Fig. 10, and

Fig. 13 is a fragmentary elevational view showing a third modified form of contact structure.

As shown in the drawings, the preferred embodiment of my invention includes a base or support member 1 for the switch, a pair of insulators 3 and 5 mounted on the support member 1, a contact jaw 7 mounted on the upper insulator 3, and a pair of blade members 9 and 11 pivotally supported on the lower insulator 5 and movable into and out of engagement with the contact jaw 7 through actuation of the switch operating mechanism.

The insulators 3 and 5 are of the usual high-voltage type and comprise a number of porcelain rain shields cemented together with a cap at the upper end and a support member at the lower end. The upper insulator 3 has a flange 15 affixed to the lower portion of its support member 17 and this flange 15 is, in turn, bolted to the base 1. The contact jaw 7, which is shown in detail in Figs. 5 and 6, is cast integral with the cap member 19 and comprises a rigid jaw portion 21 having an opening 23 therein for engaging the contact portion of the movable blade members 9 and 11. The opening 23 is restricted by means of two boss portions 25 which project inwardly from the two sides of the rigid jaw. These boss portions 25, as will be explained later, serve to lock the blade members in position when the switch is completely closed.

The lower insulator 5 is supported on the base member 1 through a ball bearing 27 and a collar 29 which are keyed to the operating shaft 31, thereby permitting the insulator to be rotated by suitable means (not shown) affixed to the end of the operating shaft. The cap portion 33 of the rotatable insulator 5 comprises an upstanding shaft member 35 having a pair of radially projecting crank members 37 and 39 formed integral therewith. Each of the crank members 37 and 39 has a slot 41 in the outer portion thereof for engaging one end of one of the blade members, screw fastenings 43 being provided for pivotally connecting the crank members and the switch blades.

The pivoted end of the blade member 9 is provided with a crooked portion 45 which, as will be explained later, permits the blade members 9 and 11 to be locked in the closed circuit position. A compression spring means 47 is positioned between the support shaft 35 and the blade member 9. This compression spring means, as is shown in Fig. 1, includes a pair of slidably engaging tubes 49 and 51 which are biased away from each other by a spring 53. One end of the spring means 47 is rotatably fastened to the support shaft 35 by means of a stud bolt 55 and the other end is rotatably fastened to the blade member 9 by means of a similar stud bolt 57 which engages a projection 59 on the blade member.

The blade members 9 and 11 are preferably constructed of copper rod or tubing and are thus possessed of considerable inherent resiliency. Each of the blade members terminates in a contact portion 61 which is welded or otherwise rigidly connected to the end thereof. These contact portions 61 are joined together by a linkage comprising a pair of links 63 pivotally fastened at one end to each of the blade members by means of pivot pins 65. The links 63 are likewise resilient and may be constructed with a slightly bowed portion as shown in Fig. 5 in order to improve the operation of the switch.

Each of the cap members 19 and 33, is provided with a terminal portion 67 for connecting the switch in an electrical circuit. The two blade members 9 and 11 are electrically connected to the cap portion 33 of the rotatable insulator 5 by means of two flexible shunts 69 which are brazed or welded to the blade members at one end and similarly fastened to the cap member itself at the other end. These shunts assure a good electrical connection from the terminal portion 67 of the rotatable insulator 5 to the blade members 9 and 11 irrespective of the pivoted support for each of the blades and add much to the reliability of operation of the switch.

The disconnecting switch is shown in the closed circuit position in Figs. 1 and 3. To open the circuit the operating shaft 31 is rotated in a counterclockwise direction (Fig. 3). The first effect of this rotation is to move the support shaft 35 from the position shown in Fig. 1 to the position shown in Fig. 2, that is, to cause the two blade members 9 and 11 to move longitudinally in opposite directions with respect to each other in a path which is defined by the connecting links 63 and the crank members 37 and 39 which form a part of the support shaft. The spring means 47 causes the blade members to be biased to the position shown in Fig. 2 throughout the circuit-opening and circuit-closing operations. In addition to the longitudinal movement of the blades which is produced by the initial rotation of the operating shaft 31, the blades 9 and 11 are caused to move laterally toward each other due to the restraining action of the connecting links. The contact portions 61 of the blade members thus disengage the rigid contact jaw 7 with a wiping action, and in addition, they move to a position where further rotation of the operating shaft 31 will cause them to disengage the contact jaw. Additional rotation of the operating shaft 31 will then move the switch to the position shown in Fig. 4, which is the open-circuit position. The amount of separation of the blade members and the contact jaw is not necessarily limited to the position shown but is dependent upon the possible rotation of the operating shaft.

The circuit closing operation is essentially the reverse of the circuit opening operation. The operating shaft 31 is rotated in a clockwise direction (Fig. 3), the blade members 7 and 9 rotate from the open circuit position to the position shown in Fig. 2, the biasing spring means 47 assuring a proper positioning of the blades so that they will move through the restricted portion of the contact jaw 7 without difficulty. Subsequent rotation of the operating shaft will then cause the blade members to move longitudinally with respect to each other whereupon the contact portions 61 of the blade members engage the cooperating portions of the jaw 7 with a wiping action. The movement of the connecting link from the angular position shown in Fig. 2 to the upright position shown in Fig. 1 acts very similarly to a toggle in causing the contact portions 61 of the blade members and the jaws to engage with a very high pressure contact. The amount of this contact pressure can be very easily controlled through the substitution of different links having more or less resiliency.

It will be noted that both the opening and the closing operations are carried out through the rotation of a single operating shaft which actuates the mechanism entirely mounted upon the rotatable insulator 5. It will also be noted that substantially no cantilever stress is put upon either of the supporting insulators during the circuit-closing or the circuit-opening operations. This last feature is almost necessary if a successful high-voltage disconnecting switch is to be built, because most of the commercial forms of supporting insulators, and in fact, all of the less expensive forms of supporting insulators, are relatively weak when subjected to cantilever stresses, although they have considerable resistance to torsional stresses. Thus the utilization of my invention permits the securing of high contact pressure in combination with a wiping action which effectively cuts through any corrosion or oxide which might form on the engaging contact surfaces, and thereby combines all of the desirable features of a high pressure disconnecting switch with none of the disadvantages heretofore encountered due to the necessity of introducing cantilever stresses on one or both of the supporting insulators.

When the disconnecting switch is in the closed-circuit position, as shown particularly in Fig. 3, the support shaft 35 and the crank members 37 and 39 have been moved to an over-center position where the blades are effectively locked in position. That is, the pivot point of the upper blade member 9 has been moved to a position to the left of the longitudinal axis of the blade member 9, and the pivot point of the lower blade member 11 has moved to a position to the right of the longitudinal axis of the blade member 11. And since the spring biasing means 47 is constantly exerting a force tending to move the upper blade member 11 in a direction toward the contact jaw 7, the reaction force of that spring biases the support shaft 35 in a clockwise direction. This biasing reaction is taken up by the engagement of the crooked portion 45 of the blade member 9 with the body of the support shaft 35, and causes the biasing spring means 47 to tend to hold the blades in the position shown in Fig. 3. The unsupported end of the blade members 9 and 11 is likewise held in the position shown in Figs. 1 and 3 due to the fact that the connecting links 63 have been moved to an upright position thereby causing sufficient lateral separation of the blade members to prevent the blade members from moving out through the restricted portion of the opening 23 in the contact jaw 7. The combined effect of both of these locking or latching actions is to eliminate any possibility of the switch being opened due to magnetic forces or other unusual line conditions, and to greatly increase its safety and reliability of operation. The disconnecting switch is not only effectively latched in, when in the closed-circuit position, but the latching means is completely releasable by rotation of the operating shaft.

The modifications shown in Figs. 7 to 11, inclusive, differ from the switch structure in Figs. 1 to 6 only in the details of the engaging contact portions. The scissors type modification shown in Figs. 7, 8 and 9 is particularly adapted for use with very high-voltage circuits wherein the disconnecting switch may be used for interrupting the line-charging current. The stationary contact means comprises an up-standing rod 75 having a stop 77 for limiting the downward motion of the blade members 79 and 81 which correspond to the blade members 9 and 11 in the previously described embodiment of my invention, an enlarged portion 83 for preventing the blade members from moving to the open-circuit position when the switch is carrying current, and an arc horn portion 85. The movable contact means consists of a pair of crossed, resilient members 87 and 89 having contact portions 91 and 93 for engaging the stationary contact rod 75, and arcing portions 95 which are utilized during the circuit interrupting operation. These two contact members 87 and 89 are joined by a pair of connecting links 97 in the same manner that the two blade members 9 and 11 of the preferred embodiment of my invention are joined.

Fig. 7 shows the contacts and a portion of the blade members 79 and 81 in the closed circuit position. It will be noted that the longitudinal circuit closing movement of the blade members 79 and 81 has caused the contact portions 93 of those members to move toward each other so as to engage the sides of the stationary contact 75 with considerable contact pressure.

When the supporting shaft (not shown) for the blade members 79 and 81 is moved to a position corresponding to Fig. 2, the movable portion of the scissors type contact means moves to the position shown in Fig. 9. The radius of each of the crank members and the positioning of the connecting links is such that the contact portion 93 of the lower contact member 89 is held in engagement with the side of the stationary contact rod 75. Thus, as the support shaft is rotated from the partially open position to the fully opened position, the contact portion 93 of the lower contact member 89 slides along the upper or arcing portion 85 of the stationary contact rod 75 and finally interrupts the circuit adjacent the arcing portion 95 of the movable contact member 89.

By interrupting the circuit so that the arc is not formed on the engaging contact surfaces, but rather on the arcing portion of the fixed and movable contact members, any damage to the normal contact surfaces is prevented and much more reliable operation of the switch results.

The modification shown in Figs. 10, 11 and 12 is essentially similar to that shown in Figs. 1 to 6 except that the blades 97 and 99, which correspond to the blade members 9 and 11 engage a contact tongue 101 instead of a contact jaw, and the lateral movement of the blade members during the circuit closing operation is in a direction toward each other instead of away from each other. This modification has the disadvantage that the connecting linkage is not moved to a stable position during the final steps of the closing operation, but must be held in the position shown in Fig. 11 by the blade actuating means which is entirely supported on the rotatable insulator. The modification, however, does permit contact portions of the blade members 97 and 99 and the contact tongue 101 to engage with a wiping action in order to cut through corrosion, and it does cause high contact pressure between the engaging surfaces.

The blade members 97 and 99 of the modification illustrated in Figs. 10, 11 and 12 are adapted to be actuated by an operating mechanism exactly similar to that shown in Figs. 1 and 6. The contact tongue 101, as shown, comprises a pair of up-standing contact portions 103 which are provided with cut away portions 105 to provide surfaces for engaging the cooperating portions of the blade members. This cut-away portion 105 of the upstanding contact portions 103 not only aids in providing a good electrical contact, but in addition it assists in holding the blade members 97 and 99 in the closed-circuit position against the magnetic reactions producing during abnormal load conditions in the connected apparatus.

The modification shown in Fig. 13 differs from the modification shown in Figs. 10, 11 and 12 only in that a single contact tongue 107 is utilized, and in that the unsupported end of each of the blade members 109 and 111, which correspond to the blade members 97 and 99, is joined to the corresponding end of the other blade member by means of a pantograph linkage utilizing two sets of links 113 and 115. In this type of construction, the inherent resiliency of the blade members is depended upon for taking up the strains induced by the double linkage, and it is possible to secure very high contact pressures without unduly increasing the force necessary to operate the switch. The double linkage pantograph construction shown in this modification is likewise applicable to the construction shown in Figs. 1 to 6.

It will thus be seen that I have disclosed an improved high-pressure contact disconnecting switch which is operable by the rotation of a single insulator, and wherein no cantilever stresses are caused upon the supporting insulators during either the circuit-opening or the circuit-closing operation. In addition, my improved disconnecting switch utilizes only two insulators, it is latched in at both the contact and the operating end, when in the circuit-closed position, and the latching means is entirely releasable through the rotation of one of the supporting insulators. I have also disclosed how a single operating mechanism mounted upon one of the two insulators of a disconnecting switch may be utilized to cause a wiping action between the engaging surfaces of a pair of contact blades and a stationary contact means in order to cut through corrosion and oxide formations.

Further, my improved operating mechanism is so arranged that the movable portions which are exposed to ice formation will tend to cause the ice to be stressed either tensionally or in shear, thus practically eliminating any possibility of the switch freezing in either the open or the closed circuit positions.

Certain modified forms of contact structure have been disclosed, and it is important to note in connection with these that it is not necessary to move each of the blades longitudinally with respect to the other, but that satisfactory switches of this type may be built and operated having only one blade longitudinally movable with respect to the other.

While in accordance with the patent statutes I have disclosed the details of a preferred embodiment of my invention, it is to be understood that many of these details are merely illustrative and that variations in their precise form will be both possible and necessary in some applications, and it is desired, therefore, that my invention be limited only as set forth in the appended claims and by the prior art.

I claim as my invention:

1. In an electric switch, a supporting insulator, a contact means associated with said insulator, a second supporting insulator, a pair of blade members supported on said second insulator, and actuating means likewise supported on said second insulator for moving said blade members into and out of engagement with said contact means, said blade members being joined together adjacent the end which engages said contact means by a linkage, at least one of said blade members being longitudinally movable, with respect to the other of said blade members, during the circuit closing operation to actuate said linkage and thereby cause said longitudinally movable blade member to intimately engage said contact means with a wiping action.

2. In an electric switch, a stationary supporting insulator, a contact means associated with said insulator, a rotatable supporting insulator, a pair of blade members supported on said rotatable insulator for movement to the open and to the closed circuit position, and actuating means supported on said rotatable insulator for causing said blade members to be moved into and out of engagement with said contact means, in response to the rotation of said rotatable insulator, said blade members being joined together adjacent the end which engages said contact means by a tie link pivotally fastened to each of said blade members, at least one of said blade members being longitudinally movable, with respect to the other of said blade members, during the circuit closing operation to cause said link to move said blades laterally and thereby effect an intimate engagement between said blade members and said contact means.

3. In an electric switch, contact means having two contact making portions, a pair of blade members, and rotatable means for moving said blade members into and out of engagement with said contact means, said rotatable means including a crank and means operable in response to movement of said crank to cause at least one of said blade members to move longitudinally with respect to the other of said blade members during the circuit closing operation, said blade members being connected together adjacent the end which engages said contact means by a linkage which is actuated by said longitudinal movement, during the circuit closing operation, to cause high contact pressure between one portion of each of said blade members and one of the contact making portions of said contact means.

4. In an electric switch, a contact means, a pair of blade members, and operating means for moving said blade members into and out of engagement with said contact means, said operating means including means for causing each of said blade members to move longitudinally with respect to the other during the circuit closing operation, said blade members being connected together adjacent the end which engages said contact means by a linkage which is actuated by said longitudinal movement of said blade members to cause high contact pressure between the engaging portions of said blade members and said contact means.

5. In an electric switch, a contact means, a pair of blade members, and rotatable means for moving said blade members into and out of engagement with said contact means, said rotatable means including means for causing each of said blade members to move longitudinally with respect to the other during the circuit closing operation, said blade members being connected together adjacent the end which engages said contact means by a link pivotally joined to each of said blades, said link being so disposed that said longitudinal movement of said blade members causes high contact pressure between the engaging portions of said blade members and said contact means.

6. In an electric switch, a contact means, a pair of blade members, and rotatable means for moving said blade members into and out of engagement with said contact means, said rotatable means including crank means for causing each of said blade members to move longitudinally with respect to the other during the circuit closing operation, said blade members being connected together adjacent the end which engages said contact means by a linkage which is adapted, during the circuit closing operation, to be actuated by said longitudinal movement of said blade members to cause more intimate engagement between the engaging portions of said blade members and said contact means.

7. In an electric switch, a contact means, a pair of blade members, and rotatable means for moving said blade members into and out of engagement with said contact means, said rotatable means including a pair of crank members for supporting said blade members and for causing each of said blade members to move longitudinally with respect to the other during the circuit closing operation, said blade members being connected together adjacent the end which engages said contact means by a linkage which is adapted, during the circuit closing operation, to be actuated by said longitudinal movement of said blade members to cause high contact pressure between the engaging portions of said blade members and said contact means, said crank members being so disposed that said blade members are locked against movement, when said switch is in the closed circuit position.

8. In an electric switch, a contact, a pair of blade members, means for swinging said blade members into position to engage said contact, and means for causing a high pressure engagement between said contact and said blade members after said switch has completed its swinging movement, said pressure securing means comprising a connecting link pivotally joined to each of said blade members adjacent the portion thereof which engages said contact and means for longitudinally moving at least one of said blade members with respect to the other to actuate said link.

9. In an electric switch, a contact means, a pair of blade members for engaging said contact means, and actuating means for moving said blade members into and out of engagement with said contact means, said actuating means including means operable during the circuit closing operation to cause at least one of said blade members to move longitudinally with respect to the other of said blade members and also to move laterally with respect to the plane of movement of said blade members, said longitudinal and said lateral movement causing at least one of said blade members to intimately engage said contact means with a wiping action during the circuit closing operation.

10. In an electric switch, a contact means, a pair of blade members for engaging said contact means, and actuating means for moving said blade members into and out of engagement with said contact means, said actuating means including means operable during the circuit closing operation to cause each of said blade members to move longitudinally with respect to the other of said blade members and also to move laterally with respect to the other of said blade members, said longitudinal and said lateral movement causing at least one of said blade members to intimately engage said contact means with a wiping action during the circuit closing operation.

11. In an electric switch, contact means, a pair of blade members for engaging said contact means, support means for said blade members, actuating means, for moving said blade members into and out of engagement with said contact means, and means operable during the closing operation of said switch to produce a high pressure, wiping engagement between the cooperating portions of at least one of said blade members and said contact means, said means for producing a high pressure wiping engagement of said cooperating portions including a connecting linkage joining said blade members adjacent the end thereof which engages said contact means, and said actuating means causing said blade member arranged for wiping engagement to move longitudinally with respect to the other of said blade members, during the circuit closing operation to actuate said pressure engagement securing means.

12. In an electric switch, contact means, a pair of blade members for engaging said contact means, rotatable support means, including at least one crank member, for said blade members, and means biasing said blade members for longitudinal movement with respect to each other, said biasing means biasing said blade members to the open circuit position when said switch is in the open circuit position, said crank member, during the circuit closing operation, causing a relative shift between the line of action of said biasing means, and said support means as to cause said biasing means to bias said blade members toward the closed circuit position when said switch is in the closed circuit position.

13. In an electric switch, contact means, a pair of blade members each having a contact surface for engaging said contact means, and actuating means for moving said blade members into and out of engagement with said contact means, said blade members being joined together adjacent the portion thereof which engages said contact means by a linkage, and at least one of said blade members being longitudinally movable, with respect to the other of said blade members, during the circuit closing operation to cause the actuation of said linkage, thereby effecting high pressure engagement between each of said contact surfaces on said blade members and said contact means when the switch is in final closed position.

14. In an electric switch, contact means, a pair of blade members for engaging said contact means, and actuating means, including a link carrying one end of one of said blade members, for moving said blade members into and out of engagement with said contact means, said blade members being joined together at the other end adjacent the portion thereof which engages said contact means by a tie link pivotally fastened to each of said blade members for movement in a plane at a substantial angle to the plane of movement of the first said link, and at least one of said blade members being longitudinally movable, with respect to the other of said blade members, during the circuit closing operation to cause said tie link to move so as to effect an intimate engagement between the cooperating contact surfaces of at least one of said blade members and said contact means.

15. In an electric switch, a contact jaw, a pair of blade members for engaging said contact jaw, and actuating means for moving said blade members into and out of engagement with said contact jaw, said blade members being joined together adjacent the portion thereof which engages said contact jaw by a linkage, and at least one of said blade members being longitudinally movable, with respect to the other of said blade members, during the circuit closing operation to effect the operation of said linkage, thereby causing sufficient relative lateral separation of said blade members to bring at least one of said blade members into intimate engagement with said contact jaw.

16. In an electric switch, a contact means, a pair of blade members each having a contact portion for engaging said contact means, and a rotatable means for moving said blade members into and out of engagement with said contact means, said rotatable means including crank means rotatable in one plane for causing at least one of said blade members to move longitudinally with respect to the other of said blade members during the circuit closing operation, said blade members being connected together adjacent the end which engages said contact means by a linkage movable in a plane generally perpendicular to the plane of said crank and which is adapted, during the circuit closing operation, to be actuated by said longitudinal movement to effect high pressure engagement between the cooperating contact portions of said blade members and said contact means.

17. In an electric switch, a contact tongue, a pair of blade members, means for moving said blade members into and out of engagement with said contact tongue, and means for causing a high pressure engagement between said contact tongue and said blade members when said switch is in the closed circuit position, said pressure securing means including a linkage for joining said blade members adjacent the portion thereof which engages said tongue and means for longitudinally moving at least one of said blade members, with respect to the other, during the circuit closing operation to actuate said linkage and move said blade members to grip said tongue therebetween.

18. In an electric switch, a contact tongue, a pair of blade members, means for moving said blade members into and out of position to engage opposite sides of said contact tongue, and means for causing a high pressure engagement between said contact tongue and said blade members when said switch is in the closed circuit position, said pressure securing means connecting said blade members adjacent the portion thereof which contacts said contact tongue and means for longitudinally moving at least one of said blade members, with respect to the other, during the circuit closing operation, to actuate said pressure securing means to move said blade members toward each other and grip said contact tongue.

19. In an electric switch, a contact tongue, a pair of blade members, and actuating means for moving said blade members into and out of engagement with said contact tongue, said actuating means including means for causing each of said blade members to move longitudinally with respect to the other during the circuit closing operation, said blade members being connected together adjacent the end which engages said contact tongue by a linkage which is actuated by said longitudinal movement of said blade members to cause high contact pressure between the engaging portion of said blade members and said contact tongue.

20. In an electric switch, a contact tongue, a pair of blade members, and actuating means for moving said blade members into and out of position to engage said contact tongue, said actuating means including means for causing each of said blade members to move longitudinally with respect to the other during the circuit closing operation, said blade members being connected together adjacent the end which engages said contact tongue by a link pivotally joined to each of said blades, said link being so disposed that said longitudinal movement of said blade members causes movement of said blade members toward each other and causes high contact pressure between the engaging portions of said blade members and said contact tongue.

21. In an electric switch, a contact tongue, a pair of swingable blade members, each of which has a contact portion for engaging said contact tongue, actuating means for moving said blade members into and out of engagement with said contact tongue, said actuating means including means operable during the circuit closing operation to cause at least one of said blade members to move longitudinally with respect to the other of said blade members, and means operable in response to said longitudinal movement to cause at least one of said contact portions to move toward the other of said contact portions and to engage said contact tongue with a wiping action during the circuit closing operation.

22. In an electric switch, a contact tongue, a pair of swingable blade members, each of which has a contact portion for engaging said contact tongue, and actuating means for moving said blade members into and out of engagement with said contact tongue, said blade members being interconnected adjacent the end thereof which engages said tongue by a linkage which is operable to move said contact portions toward each other, said actuating means including means operable during the circuit closing operation to cause at least one of said blade members to move longitudinally with respect to the other of said blade members in order to effect the operation of said linkage and thereby cause at least one of said contact portions to intimately engage said contact tongue with a high pressure wiping action during the circuit closing operation.

23. In an electric switch, a contact means, a pair of blade members of conducting material for cooperating therewith, and means for mechanically interconnecting said blade members in such manner that the inherent resilience of at least one of said blade members is utilized for resiliently biasing the engaging contact surfaces of said contact means and said blade members into engagement with one another when said switch is in the closed circuit position.

24. In an electric switch, a substantially rigid contact means, a pair of relatively long blade members of conducting material having substantially rigid contact portions for cooperating with said contact means, and means for mechanically interconnecting said blade members, at a predetermined distance from the portions thereof which engage said contact means, in such manner that the inherent resiliency of said relatively long blade members is utilized for resiliently biasing said rigid contact portions into engagement with said rigid contact means when said switch is in the closed circuit position.

25. In an electric switch, a contact means, a pair of blade members of conducting material for cooperating therewith, a linkage pivotally connected to each of said blade members at a predetermined distance from the portions thereof which engage said contact means, said linkage serving to provide a fulcrum point for each of said blade members during the circuit closing operation, and means for causing movement of said blade members about said fulcrums during the circuit closing operation, in order that the inherent resilience of said blade members may be utilized for resiliently biasing said rigid contact portion into engagement with said rigid contact means when said switch is in the closed circuit position.

26. In an electric switch, a substantially rigid contact jaw, a pair of blade members having substantially rigid contact portions for cooperating therewith, a link member pivotally connected to each of said blade members adjacent said contact means, said link being so positioned that it provides a fulcrum point for at least one of said blade members during the circuit closing operation, and means for causing relative lateral movement of said blade members during the circuit closing operation, said lateral movement causing at least one of said blade members to move about said fulcrum in such manner that the inherent resilience of said blade member may be utilized for resiliently biasing said rigid contact portions into engagement with said rigid contact jaw when said switch is in the closed circuit position.

27. In an electric switch, contact means having substantially rigid contact portions, a pair of relatively long blade members of conducting material having substantially rigid contact portions for cooperating with said first mentioned contact portions, and actuating means for moving said blade members into and out of engagement with said contact means, said blade members being joined together adjacent the said contact portions thereof by a linkage, at least one of said blade members being longitudinally movable with respect to the other of said blade members during the circuit opening operation to cause the actuation of said linkage, thereby effecting an intimate engagement between the cooperating contact portions of at least one of said blade members and said contact means, and said linkage being positioned a predetermined distance from said contact portions of said blade means in order that the inherent resilience of at least one of said blade members shall be utilized for resiliently biasing the engaging contact portions of said contact means and said blade members into engagement with one another when said switch is in the closed circuit position.

28. In an electric switch, a substantially rigid contact means, a pair of relatively long blade members of conducting material having substantially rigid contact portions for cooperating with said contact means, and actuating means for moving said blade members into and out of engagement with said contact means, said blade members being joined together adjacent the portions thereof which engage said contact means by a tie link pivotally fastened at one of its ends to each of said blade members, at least one of said blade members being longitudinally movable with respect to the other of said blade members during the circuit closing operation to cause said link to move so as to produce relative lateral movement of said blade members, which lateral movement effects an intimate engagement between the cooperating contact portions of said blade members and said contact means, and said link being joined to each of said blade members at a predetermined distance from the contact portions thereof in order that the inherent resilience of said blade members may be utilized for resiliently biasing said cooperating contact portions into engagement with each other when said switch is in the closed circuit position.

29. In an electric switch, a contact means, a cooperating blade assemblage comprising a pair of blade members supported for swingable movement into and out of position to engage said contact means, each of said blade members having a contact portion for engaging said contact means, actuating means for said blade assemblage operable during the circuit closing operation of said switch to cause at least one of said blade members to move longitudinally with respect to the other of said blade members, and means operable in response to said longitudinal movement to produce relative lateral movement between the contact portions of said blade members, thereby causing the contact portion of at least one of said blade members to intimately engage said contact means with a wiping action.

30. In an electric switch, a contact means, a cooperating blade assemblage comprising a pair of blade members supported for swingable movement into and out of position to engage said contact means, each of said blade members having a contact portion for engaging a portion of said contact means, actuating means for said blade assemblage operable during the final portion of the circuit closing operation of said switch to cause at least one of said blade members to move longitudinally with respect to the other of said blade members, and a linkage joining said blade members adjacent the end thereof which engages said contact means, said linkage being operable in response to said longitudinal movement to produce relative lateral movement between the contact portions of said blade members, thereby causing the contact portion of at least one of said blade members to intimately engage the cooperating portion of said contact means with a wiping action.

31. In an electric switch, a contact means, a cooperating blade assemblage comprising a pair of blade members supported for swingable movement into and out of position to engage said contact means, each of said blade members having a contact portion for engaging said contact means, actuating means for said blade assemblage operable during the circuit closing operation of said switch to cause at least one of said blade members to move longitudinally with respect to the other of said blade members, and means operable in response to said longitudinal movement to produce relative lateral movement between the contact portions of said blade members, thereby causing the contact portion of at least one of said blade members to intimately engage said contact means with a wiping action, said last mentioned means including means for mechanically holding said blade members in spaced relation at least when in final contact making position at a point some distance from the engaging portions of said blade members and said contacts in order that the inherent resilience of at least one of said blade members shall be utilized for biasing the engaging portions of said contact means and said blade members into engagement with one another.

32. In an electric switch, a pair of spaced insulator columns, a contact means supported upon one of said columns, a blade means, actuating means for moving said blade means to open and to close said switch, said blade means comprising a pair of blade members, each of which has a contact portion for engaging a cooperating contact portion forming a part of said contact means, said blade members being joined together by suitable connecting members to form a quadrilateral assemblage, said assemblage being supported so as to permit both of said blade members to be swung into and out of engagement with said contact means and to permit one of said blade members to be moved longitudinally with respect to the other, and spring means mechanically connected at one of its ends to one of said blade members and at the other of its ends to one of said connecting members for biasing said assemblage to a predetermined position.

33. In an electric switch, contact means, a pair of blade members of conducting material for engaging said contact means, means for spacing said blade members when in final closed position at a point spaced from said contact means so that the inherent resilience of said blade members supplies contact pressure between said blade members and said contact means, and actuating means for the switch operable to first release said contact pressure and thereafter move said blade members away from said contact means.

34. In an electric switch, contact means having a pair of opposed contact surfaces, a pair of blade members each having a contact portion for engaging one of said contact surfaces, operating means for swinging said blade members into position to engage said contact means and including means for thereafter moving said blade members laterally at a point spaced from said contact portions until said contact portions of the blade members are biased by the resilience of the blade members into high pressure contact with said contact means.

35. In an electric switch, contact means having a pair of opposed contact surfaces, a pair of blade members each having a contact portion for engaging one of said contact surfaces, operating means for swinging said blade members into position to engage said contact means and including means for thereafter moving said blade members laterally at a point spaced from said contact portions until said contact portions of the blade members are biased by the resilience of the blade members into high pressure contact with said contact means, and said means for moving the blade members laterally being actuated by longitudinal movement of one of said blade members.

HERBERT J. CRABBS.